No. 752,836. PATENTED FEB. 23, 1904.
A. GUSINDE.
APPARATUS FOR TEACHING SINGING.
APPLICATION FILED APR. 16, 1903.
NO MODEL.
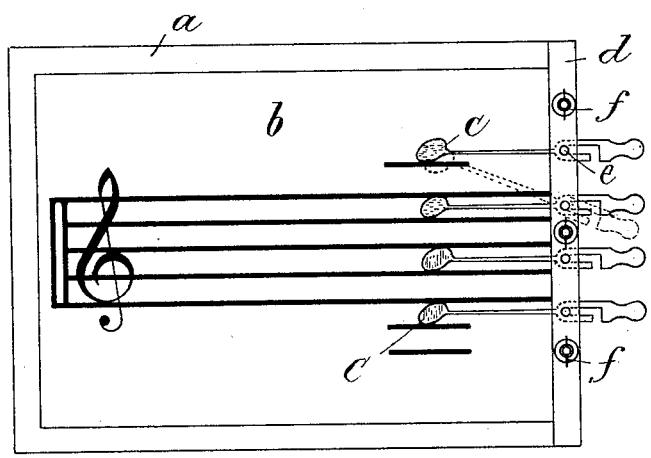
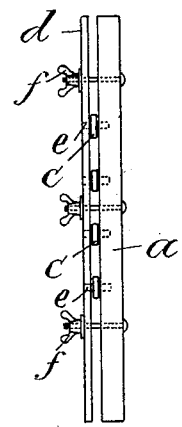
WITNESSES
H. M. Kuehne
John A. Perewal
INVENTOR
Alois Gusinde
BY Richard
ATTORNEYS
THE NORRIS PETERS CO., PHOTO-LITHO., WASHINGTON, D. C.

No. 752,836. Patented February 23, 1904.

UNITED STATES PATENT OFFICE.

ALOIS GUSINDE, OF BERLIN, GERMANY.

APPARATUS FOR TEACHING SINGING.

SPECIFICATION forming part of Letters Patent No. 752,836, dated February 23, 1904.

Application filed April 16, 1903. Serial No. 152,934. (No model.)

*To all whom it may concern:*

Be it known that I, ALOIS GUSINDE, rector, a subject of the Emperor of Germany, residing in Berlin, in the Empire of Germany, (whose full postal address is 41 Mohrenstrasse, Berlin, aforesaid,) have invented certain new and useful Improvements in Apparatus for Teaching Singing, of which the following is a full, clear, and exact specification.

This invention relates to means whereby in the teaching of singing the position of the notes in the staff-lines and leger-lines belonging thereto can be represented in such a concrete form that the alteration in the position of the notes corresponding to a succession of several sounds can be made visible by the adjustment of one and the same concrete sign.

The means of instruction consist of a tablet furnished with a musical staff on one of the ends of which stems, each bearing a note-head, are pivoted.

Figure 1 is a front view of this device; Fig. 2, a side view.

The tablet employed consists of a wooden frame $a$, into which a plate $b$, furnished with a musical staff, is fixed. On one of the ends of the frame $a$ pins $e$ are provided, which engage in holes formed in a bar $d$, which is arranged above the end in question. By means of bolts and the winged nuts $f$ the bar $d$ can be firmly pressed against the end of the frame beneath. The notes $c$ are stamped out of sheet metal and are each seated on a stem of suitable length. These stems are widened at one end and formed with a handle. In the widened part of each stem a notch is made in front of the handle and communicates with a longitudinal slot, by means of which when the winged nuts $f$ are suitably unscrewed—that is to say, the bar $d$ loosened—the notes can be brought on the pins $e$, and thus be pivoted. When the notes have been put on, the bar $d$ is tightened, so that the notes remain in the position in which they were adjusted, but can be easily brought into another position.

For the purpose of representing the position of the notes corresponding to the different sounds a single note $c$ is suitably arranged on the tablet, by the adjustment of which all the positions of the notes can be shown in concrete form, the alteration in the position of the notes, which is made clearly visible when a fresh tone is represented, facilitating in a most extraordinary degree the understanding of the differences in the tones. In the representation of chords and practice in part singing a number of notes $c$, corresponding to the number of parts, is arranged, and can be colored different for the different parts. By proper adjustment of the notes each chord can be represented in a concrete form, whereby the understanding of the part is facilitated and a better impression of the chords obtained.

What I claim, and desire to secure by Letters Patent, is—

1. An apparatus for teaching singing consisting of a tablet furnished with a musical staff, a frame surrounding the tablet, stems pivoted on the frame and provided with note-heads and a clamping-bar adapted to hold the stems in any adjusted position in relation to the staff, substantially as described.

2. Apparatus for teaching singing consisting of a tablet furnished with a musical staff, a frame surrounding the tablet, stems or rods pivoted on the frame, and provided at opposite ends with notched handles and note-heads, a clamping-bar adapted to bear against the handles and hold the note-stems in any adjusted position in relation to the staff substantially as described.

In witness whereof I have hereunto set my hand in presence of two witnesses.

ALOIS GUSINDE.

Witnesses:
 HENRY HASPER,
 WOLDEMAR HAUPT.